United States Patent Office 3,424,777
Patented Jan. 28, 1969

3,424,777
PROCESS OF PRODUCING π-ALLYL METAL ANION COMPOUNDS
Günther Wilke, Mulheim an der Ruhr, Germany, assignor to Studiengesellschaft Kohl m.b.H., Mulheim an der Ruhr, Germany
No Drawing. Continuation-in-part of application Ser. No. 272,881, Apr. 15, 1963. This application Aug. 6, 1964, Ser. No. 387,990
Claims priority, application Germany, Aug. 10, 1963, St 20,974
U.S. Cl. 260—439  9 Claims
Int. Cl. C07f 15/04

ABSTRACT OF THE DISCLOSURE

Reaction of a π-allyl compound of a transition metal with either halogen or with an H+X− compound in which X− is an anionic radical. The resulting compounds have utility as polymerization and oligomerization catalysts.

This application is a continuation in part of application Ser. No. 272,881, filed Apr. 15, 1963, now abandoned.

This invention relates to new and useful improvements in π-allyl-metal compounds. I have discovered that π-allyl compounds of the transition metals of side groups III to VIII, and especially those of the IVth to VIIIth groups of the Periodic System, are as such, or in combination with other materials, for example Lewis acids and/or electron donors, such as Lewis bases and the like, excellent polymerization (including oligomerization) catalysts and especially for the production from mono- and diolefins of open chain oligomers and of higher molecular weight polymers. The obtaining of such π-allyl compounds for which the effective grouping is

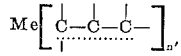

in which Me is a transition metal of the IIIrd to the VIIIth side groups of the Periodic System, and preferably of the IVth to VIIIth such group, and $n'$ is an integer of 1–4, has been set forth in my co-pending application, Ser. No. 272,881, and their use as polymerization catalysts is set forth in my co-pending application, Ser. No. 387,826, filed Aug. 6, 1964, now Patent No. 3,379,706. Said last mentioned co-pending application further sets forth as polymerization catalysts such π-allyl compounds for which the effective grouping is

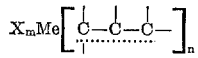

Me having the same meaning as above, X designating an anionic radical, and $m$ and $n$ each designating an integer of 1–3 with $m+n$ being 2–4.

One object of the invention comprises the production of compounds of the type π-allyl-Me-X of the general Formula I

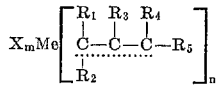

in which Me signifies a transition metal of the sub-groups to groups IV to VIII of the Periodic System, X an anionic radical, $m$ and $n$ whole numbers of 1–3, with $m+n$ being 2–4 and $R_1$ to $R_5$, which may be similar or different, a member of the group consisting of hydrogen, alkyl, cycloalkyl, aralkyl or aryl, wherein the radicals $R_1$ or $R_2$ or $R_3$ and $R_4$ or $R_5$ may also be bound into an olefinic unsaturated ring system, with at least 3 and preferably 5–12 ring members. It is characteristic for the compounds of Formula I, that the transition meals are bound to a π-allyl-system or π-allyl-systems, and in the simplest case to the π-allyl group as such or their hydrocarbon, i.e. alkyl, aryl or aralkyl and their cyclic derivatives. As π-allyl-system is defined a grouping of 3 C-atoms, which is bound as a substantially planar system to a central atom in substantially the same manner by way of all 3 C-atoms.

In the simplest case of the bis-π-allyl-nickel with an empirical formula $\pi(C_3H_5)_2Ni$ this type of bond is represented as follows:

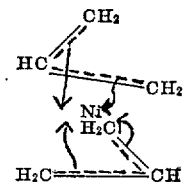

The roentgenographic structural analysis of the corresponding methyl derivative, the bis-π-methallyl nickel, has shown that a "sandwich" type compound is involved in which the two methallyl groups are bound to the nickel atom as planar systems in such manner that the $CH_3$ groups go into the anti-position:

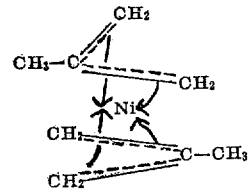

In the compounds of type I, producible in accordance with the invention, one each such planar π-allyl system is bound to a metal atom.

The metals occur in these compounds in different formal valences, and accordingly 1 to 4 of such π-allyl-systems are bound to the particular transition metal. Likewise the possibility exists that 2 of such π-allyl-systems are connected with one another via the substituents $R_1$–$R_5$, so that an open-chain system exists, which is bound to the transition metal via 2 π-allyl-groups.

π-allyl-compounds of the transition metals of the general Formula II

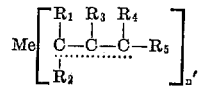 II in which $n'$ is an integer of 1–4 and $R_1$–$R_5$ are as above given, may, for example, be produced from the transition metal halide, such as nickel bromide, in a Grignard reaction with an allyl (or substituted allyl) magnesium chloride, as more fully set forth in my copending application, Ser. No. 272,881 corresponding to German patent application St 19,116 IVb/12 o.

Some π-allyl-Me-X compounds are already known. Thus E. O. Fischer and G. Bürger [Z. Naturforsch. 16b, 77 (1961) Report 94, 2409 (1961)] have for the first time described the preparation of the π-allyl-nickel bromide from the extremely poisonous nickel carbonyl and allyl bromide. The yields were given as only 11% of theory. Also known is the conversion of butadiene-iron-tricarbonyl with anhydrous hydrogen chloride [F. J. Impastato and K. G. Ihrman, J. Am. Chem. Soc. 83, 3726 (1961)], which leads to the formation of a π-crotyl-iron-tricarbonyl-chloride.

However, these methods for the preparation of these compounds are unsatisfactory since the reaction products can be obtained only in low yields and since it is necessary to proceed for their production from the generally extremely poisonous metal carbonyls. A further disadvantage of these processes consists therein, that frequently not the pure compounds of the above named type are formed, but that complexes result in which still further substituents, such as for example CO-groups, are contained.

It was found that compounds of the type π-allyl-Me-X of the general Formula I may be produced very easily and with practically quantitative yields directly from π-allyl compounds of the transition metals of the subgroups IV to VIII of the Periodic System having at least twice the effective grouping

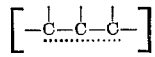

III bonded to Me as for instance in the general Formula II in which n' is at least 2.

I have discovered that these π-allyl Me compounds, in which the π-allyl moiety is present at least twice, form π-allyl-Me-X compounds when reacted, such as by contacting, with an acid of the type HX. The anionic radical X⁻ attaches to the transition metal of the π-allyl compound and the liberated H⁺ splits off one of the allyl radicals and is thus removed.

The reaction in accordance with the invention proceeds with HX according to the Equation 1

$$\pi\text{-}(C_3H_5)_2Ni + HCl \rightarrow \pi\text{-}(C_3H_5)NiCl + C_3H_6 \quad (1)$$

Thus, for each equivalent HX, one equivalent of allyl radical is detached from the transition metal.

In similar manner, the compounds of the type π-allyl-Me-X may be produced if one proceeds from complexes of transition metals with exclusive multiple olefins by reacting these with an acid HX. The expression "exclusive multiple olefins" means hydrocarbon moieties which have olefinic unsaturation as the sole functional group or groups. Cyclooctatetraene-nickel-(0) is an example for a complex of a transition metal connected to a multi-ene cyclic structure producible, for example, according to my copending application, Ser. No. 532,900. Further complexes of transition metals with exclusive multiple olefins can be produced, for example, according to my copending applications Ser. No. 104,221 and Ser. No. 532,900. Thus, π-cyclooctatrienyl-nickel chloride can be produced by reaction of cyclooctatetraene-nickel-(0) with anhydrous hydrogen chloride according to the following Equation 2

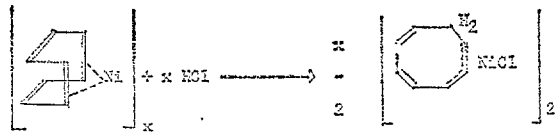

The X in HX signifies an anionic radical to which is bound the hydrogen atom in the sense of the polarization H⁽⁺⁾X⁽⁻⁾. Compounds of the type HX are preferably anhydrous hydrogen halides, though also other acid compounds, for example, organic acids and particularly carboxylic acids, as well as phenols, thiophenols, mercaptans, hydrocyanic acid and 1,3-diketones (enol form) may be used.

Furthermore, the π-allyl-Me-X compounds can also be produced by reacting the π-allyl-Me compounds in which the π-allyl moiety is present at least twice, with a halogen in lieu of an acid (H⁺X⁻). In this case, the halogen attaches to the transition metal displacing an allyl radical. The reaction in accordance with the invention, using a halogen instead of an HX compound, proceeds according to the Equation 3

$$\pi\text{-}(C_3H_5)_3 + \tfrac{1}{2}I_2 \rightarrow \pi\text{-}(C_3H_5)_2CrI + C_3H_5^* \quad (3)$$

wherein for each equivalent of halogen reacted, one equivalent of allyl radical is detached from the transition metal. Preferred halogens are iodine and bromine.

The processes in accordance with the invention are advantageously carried out with solutions of the starting materials in solvents inert for the π-allyl metal compounds and the referred to complexes, since the reactions proceed in solution precisely stoichiometrically. Suitable solvents are aliphatic or aromatic ethers, cyclic ethers, saturated or aromatic and halogenated hydrocarbons substantially inert to these compounds and complexes. The conversions are preferably carried out at temperatures of from −80 to +100°.

In most cases the reaction products result at once in crystallized form. In some cases the reaction products are re-crystallized from suitable solvent solutions.

All operations in the following examples were carried out under exclusion of air and humidity, i.e., under a protective gas, such as for example argon or nitrogen, since the compounds producible in accordance with the invention are sensitive to air or humidity.

EXAMPLE 1

Into a solution of 47 g. bis π-allylnickel in about 1000 cm.³ ether are introduced slowly under stirring at −80° equimolecular quantities (8.0 l. at 20°) of anhydrous hydrogen chloride. The initially yellow-orange colored solution therein becomes red-brown. After a short time brown crystals of π-allylnickel-chloride separate from the solution. The suspension is stirred for another hour at −80°, and for the completion of the reaction briefly heated up to 20°. Again one cools to −80°, filters off the crystals and dries them in a vacuum. Obtained are 33 g.=73% of the theory.

Product of the composition C₃H₅NiCl.

Calculated 43.5%, found 43.3% Ni. From the mother liquor further quantities of the compound may be isolated.

EXAMPLE 2

A solution of 25 g. bis-π-allylnickel in about 1000 cm.³ ether is converted according to Example 1 at −80° with 4.1 anhydrous hydrogen bromide. The reaction mixture is worked up according to Example 1 and obtained are 27.0 g.=88% of the theory.

Product of the composition C₃H₅NiBr.

Calculated 32.7%, found 32.4% Ni.

EXAMPLE 3

A solution of 41.3 g. bis-π-allylnickel in about 1000 cm.³ ether is converted according to Example 1 at −80° with 7.4 l. (5% excess) anhydrous hydrogen iodide. Obtained are 59 g.=89% of the theory of red crystals of the composition C₃H₅NiI.

Calculated 25.9%, found 25.6% Ni.

EXAMPLE 4

According to Example 1 bis-π-methallylnickel is converted at −80° with anhydrous hydrogen chloride. From the red-brown reaction solution are isolated red-brown crystals of the composition C₄H₇NiCl.

Calculated 39.3%, found 39.2% Ni.

EXAMPLE 5

According to Example 1 is converted an ethereal solution of bis-π-crotylnickel at −80° with anhydrous hydrogen chloride. Obtained is, in the form of red-brown crystals, the π-crotyl-nickelchloride of the composition C₄H₇NiCl.

Calculated 39.3% Ni, found 39.5% Ni.

EXAMPLE 6

According to Example 1 are converted 0.61 g. bis-π-cyclooctenyl-nickel in ethereal solution at −80° with equimolecular quantities (72 cm.³ at 20°) anhydrous hydrogen chloride. The solvent is evaporated and the residue freed from cyclooctene at 10⁻⁴ torr (Torricellian vacuum). Subsequently the residue is re-crystallized from an ether/pentane-mixture. The π-cyclooctenylnickelchloride is obtained in the form of red-brown crystals of the composition $C_8H_{13}NiCl$.

Calculated 28.9%, found 28.9% Ni.

EXAMPLE 7

9 g.=52.4 mmol tris-π-allylchromium are converted in 1.5 l. ether at −80° with 1.87=51.4 mmol anhydrous hydrogen chloride. The mixture is stirred for one hour and subsequently filtered over a G–4 frit. At −20° the solvent is removed and the residue subsequently dried at $10^{-4}$ torr. The yield of bis-π-allyl-chromiumchloride amounts to 80%. A sample recrystallized from ether shows the following composition:

Calculated for $(Cr(C_3H_5)_2Cl)_2$: M.W., 339.22; Cr, 30.65%; Cl, 20.95%. Found: M.W., 333; Cr, 30.48%; Cl, 21.20%.

EXAMPLE 8

2.9 g.=15.84 mmol tris-π-allylcobalt are converted in 250 cm.³ ether with 355 cm.³=15.84 mmol anhydrous hydrogen chloride at −80°. The reaction mixture is stirred for two hours at −50°. Obtained is a red-brown crystallizate, which is isolated at low temperatures and subsequently dried at −80° and $10^{-4}$ torr. The product was analyzed in the following manner:

The crystals were suspended at −80° in 200 cm.³ of cold toluene. The mixture then was heated to −25°, so that a clear red solution resulted. At temperatures above −20° the complex already decomposes slowly. 2 cm.³ each of this solution were analyzed as well as to cobalt as also to halogen; 2 cm.³ of the above named solution contained: 0.0357 mmol cobalt and 0.035 mmol chlorine. Accordingly the yield of bis-π-allylcobaltchloride amounts to 22.5% and the product is of about 98% purity.

EXAMPLE 9

12.3 g. bis-cyclooctadienyl-nickel-(0) are suspended in 100 cm.³ toluene and converted at 0° under stirring with 1070 cm.³ (at 20°) anhydrous hydrogen chloride. The solution at once becomes colored deep-red, and at the walls of the reaction vessel forms a thin nickel surface. The red solution is evaporated and the residue recrystallized from methylene-chloride. The red powder, resulting in almost quantitative yield, corresponds to the composition $C_8H_{13}NiCl$. It is identified as a π-cyclooctenylnickelchloride.

Calculated 28.9%, found 28.0% Ni.

EXAMPLE 10

10.0 g.=36.4 mmol bis-cyclooctadiene-nickel-(0) are suspended in 50 cm.³ benzene, and converted at 20° with 2.0 cm.³ glacial acetic acid (2.1 g.=35 mmol). Within about 25 minutes the crystals dissolve and after further 20 minutes all volatile constituents are distilled off at $10^{-4}$ torr. The remaining red oil is dissolved in 50 cm.³ hexane. The solution is cooled to −70°, wherein red-brown crystals are separated.

Yield: 5.5 g.=67% of the theory of π-cyclooctenyl-nickelacetate:

Calculated for $C_{10}H_{16}O_2Ni$: 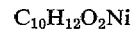 M.W., 226.7; Ni, 25.9%. Found: M.W., 363; Ni, 25.95%.

EXAMPLE 11

11.2 g.=40.8 mmol bis-cyclooctadiene-nickel-(0) are suspended in 75 cm.³ toluene and converted at 20° with 4.5 cm.³ ethylmercaptan. The mixture is stirred for 4 hours and subsequently filtered over a G–4 frit. The filtrate is evaporated and the crystalline residue is recrystallized from a toluene/hexane mixture. The crystals corerspond to the π-cyclooctenylnickelmercaptide of the composition $C_{10}H_{18}SNi$. The red-brown crystals showed the following analysis.—Calculated: Ni, 25.70%. Found: Ni, 26.0%. Calculated: M.W., 228.7 (as dimer 457.4). Found: M.W., 462.

EXAMPLE 12

19.6 g.=71.3 mmol bis-cyclooctadiene-nickel-(0) are treated in 50 cm.³ benzene with 10 cm.³=97.7 mmol acetylacetone. The suspension is stirred for in all 4–5 days until all crystals have become dissolved. Subsequently all volatile constituents are distilled off at $10^{-1}$ torr and maximally 40°. The residue is dissolved in 50 cm.³ hexane (about 50°) and then the solution is cooled to 0°. Obtained are 13–14 g. of red-brown crystals, which may be sublimated at $10^{-4}$ torr and 60°.

Yield: 75% of the theory of the π-cyclooctenylnickel-acetylacetonate.

Calculated for $C_{13}H_{20}O_2Ni$: C, 58.50%; H, 7.51%; Ni, 22.0%. Found: C, 58.18%; H, 7.97%; Ni, 22.1%.

EXAMPLE 13

6.44 g.=39.6 mmol cyclooctatetraene-nickel-(0) are converted in the course of 2 hours at 45–50° with 25 cm.³ pure glacial acetic acid. Subsequently all volatile constituents are distilled off in vacuum. The residue is recrystallized from 250 cm.³ toluene at 70°. Obtained are 5.3 g.=60% of the theory of red crystal needles of the π-cyclooctatrienylnickelacetate of the composition $$C_{10}H_{12}O_2Ni$$

Calculated: M.W., 222.8 (or respectively as dimer 445.5); Ni, 26.3%. Found: M.W., 494; Ni, 26.0%.

EXAMPLE 14

2.05 g.=12.6 mmol cyclooctatetraene-nickel-(0) are heated for 5 hours in 25 cm.³ acetylacetone to 100°. One permits to cool and then filters the intensely red colored solution. The filtrate is evaporated in vacuum and the residue is dissolved in hot hexane. Obtained are 0.5 g.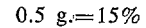=15% of the theory of brown crystals of the π-cyclooctatrienyl-nickelacetylacetonate of the composition $C_{13}H_{16}O_2Ni$.

Calculated: Ni, 22.3%. Found: 22.3%.

Undissolved remains in hexane 1.2 g. nickel-acetylacetonate.

EXAMPLE 15

50.3 g.=0.31 mmol cycloocetatetraene-nickel-(0) are suspended in 750 cm.³ toluene and at −80° converted slowly under shaking with 7.55 l. anhydrous hydrogen chloride. One permits thawing to 20° and filters off the red suspension formed. From the mother liquors further constituents may be isolated. In all are obtained 46 g.=75% of the theory of reaction product of the composition $C_8H_9ClNi$, i.e., thus π-cyclooctatrienyl-nickelchloride.

Calculated: Ni, 29.5%; Cl, 17.85%. Found: Ni, 29.2%; Cl, 18.15%.

EXAMPLE 16

5.5 g.=31.4 mmol tris-πallylchromium are dissolved in 350 cm.³ ether and converted at 0° with a solution of 3.99 g.=15.7 mmol iodine in 100 cm.³ ether. The mixture is stirred overnight at 0° and subsequently concentrated in vacuum to about 50 cm.³. Brown crystals separate. For the completion of the crystallization one cools to −80° and then filters off the reaction product. One washes with a little ether at −80° and subsequently one dries at $10^{-4}$ torr. The yield of bis-π--allyl-chromium-iodide amounts to 7 g.=85% of the theory.

Calculated for $(Cr(C_3H_5)_2I)_2$: M.W., 522.13; Cr, 19.92%; I, 48.61%. Found: M.W., 490; Cr, 19,95%; I, 48.25%.

EXAMPLE 17

Into a solution of 6.6 g. bis-π-allylnickel in 400 cm.³ ether is added drop by drop under stirring at −80°, a solution of 11.9 g. iodine in ether. A black precipitation results. The solvent is distilled off and the residue extracted with fresh ether. The filtered extract is cooled to −80°, therein deep-red shining crystals of π-allyl-nickeliodide are separated.
Yield: 2.75 g.=25% of the theory.
Calculated: Ni, 25.9%. Found: Ni, 25.4%.

EXAMPLE 18

0.05 g.=27.7 mmol tris-π-allylcobalt are dissolved in 200 cm.³ ether and converted at −50 to −60° with a solution of 3.52 g.=13.85 mmol iodine in 60 cm.³ ether. The mixture is kept overnight under stirring at −80°. Therein brown crystals are separated, which are rendered impure by slight quantities of green crystals. The crystallizate freed from the solvent is dried at −80° and 10⁻⁴ torr. The crystallizate is treated at −80° with 200 cm.³ cold toluene and the mixture heated to −30°. One filters and obtains a deep-red clear solution. 2 cm.³ each of the solution obtained were analyzed as to cobalt, or respectively as to iodine. 2 cm.³ contained 0.0862 mmol cobalt, or respectively 0.0850 mmol iodine. Accordingly, the bis-π-allylcobaltiodide is of 98.7%, while the yield amounts to 31.2%. This indirect analysis is necessary since the product is not stable at room temperature.

EXAMPLE 19

1.07 g.=5.65 mmol bis-π-allyl-palladium are dissolved in 50 cc. of ether. There was then passed into this solution, which was cooled to −80° 150 cc. of dry HCl gas (105% of theory). Thereafter the solvent is distilled off at 10 torr and the yellow residue is crystallized from toluol. There are obtained 0.8 g.=80% of theory of pure π-allyl-palladiumchloride.

EXAMPLE 20

1.84 g.=4.25 mmol bis-π-allyl-platinum were dissolved in 50 cc.of pentane whereupon the product was reacted at −80° with 120 cc. of dry HCl gas (107% of theory). A bright yellow compound precipitates, which is difficulty soluble in all normal solvents. After separation of the product by filtration, the same is washed with pentane and dried. There is obtained 1.1 g.=94.5% of theory of π-allyl-platinum chloride.

EXAMPLE 21

3.1 g.=12.5 mmol 1-allyl-1,2,3,4-tetramethyl-π-cyclobutenyl-π-allyl-nickel of the formula

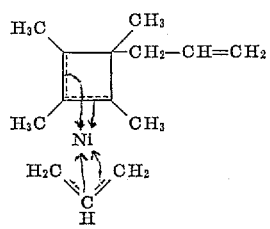

are dissolved in 50 cc. of pentane and are reacted at −80° with 325 cc. of dry HCl gas (104% of theory). There then immediately precipitates a reddish-brown product from which the solvent is removed at 10⁻⁴ torr and 0°. The residue is 2.73 g.=90% of theory. The raw product is then recrystallized from ether and there are obtained a pure 1-allyl-1,2,3,4-tetramethyl-π-cyclobutenylnickelchloride of the formula

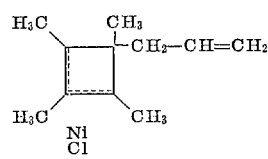

Calculated: Nickel, 24.2%. Found: Ni, 24.2%.

EXAMPLE 22

3 g.=13.7 mmol of the bis-π-allyl compound n-C₁₂H₁₈Ni of the following structure formula

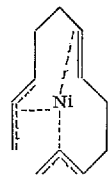

are reacted in 100 cc. ether with gaseous HCl at −40° C. Excess HCl as well as the ether are then removed in vacuum. The residue is dried in high vacuum at 20° C. There are obtained a red oil, the composition of which corresponds to the empirical formula C₁₂H₁₉NiCl and the structure of which corresponds to the H¹-NMR-spectrum as well as the IR-spectrum of the following formula:

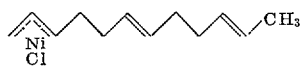

Calculated: Ni, 22.8%. Found: Ni, 22.3%.

EXAMPLE 23

1.92 g.=7.53 mmol tetra-π-allylzirconium are dissolved in 200 cc. ether at −80° C. The reaction vessel is evacuated, whereupon 337.6 N cc.=0.55 g.−15.06 mmol of dry HCl gas is admitted with stirring and vigorous cooling. Upon termination of the reaction the solution is concentrated to about 50 cc. whereby the bis-π-allylzirconium-dichloride precipitates in the form of fine, light yellow crystals. The crystals are collected on a clay plate at low temperatures, washed with a little cold ether and then dried in vacuum on the plate. There is obtained 1.2 g.=4.92 mmol of the product, i.e. the yield is 65% of theory. The yield may be increased by further concentrating the filtrate. The bis-π-allylzirconium-dichloride decomposes at 20° C. in the course of a few hours. On reaction with alcohol there are obtained 2 mol propylene per gram atom zirconium.

EXAMPLE 24

2.33 g.=24.8 mmol phenol are dissolved in 50 cc. of ether and added dropwise at −40° C. to a solution of 4.35 g.=24.8 mmol of tris-π-allylchromium in 100 cc. of ether. The mixture is kept at −10° C. for 12 hours. Brownish crystals are precipitated thereby. The mixture is cooled to −80° C. and the crystals are separated. The residue is washed with small amounts of ether and dried at −80° C. and 10⁻⁴ mm. Hg. There are obtained 3.9 g. =70% of theory of bis-π-allylchromiumphenolate in the form of brownish crystals which correspond to (C₃H₅)₂Cr(OC₆H₅).

EXAMPLE 25

0.93 g.=2.66 mmol of tetra-π-allyltungsten dissolved in 50 ml. of pentane are reacted at −80° C. with 70 cc.=2.66 mmol of gaseous hydrogen chloride. The mixture is warmed up to −30° C. while vigorously stirring. A yellow precipitate is formed which is separated and dried at 10⁻⁴ mm. Hg. There are obtained 0.7 g.=77% of theory of tris-π-allyltungsten chloride which corresponds to (C₃H₅)₃WCl.

The properties, activity and reactivity of the π-allyl metal compounds herein described are solely due to the π-allyl linkage and the particular stereo positioning of atoms thereby defined. Thus their effective grouping which is controlling for said properties, activity and reactivity is

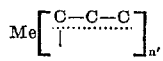

or

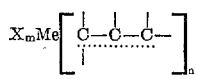

in which Me is a transition metal as defined above and in which X⁻ is an anionic acid radical and preferably halogen, n' is an integer of 1–4, m and n each designating an integer of 1–3, with m+n being 2–4. For this reason any particular substituent or substituents are generally not material in either the conversion of the Me π-allyl to its "salt" compound or to their catayltic or other properties or reactivities. This is well illustrated by the fact that short and long chain aliphatic substituents, cyclic substituents, including those of the bulky pinenyl and various aromatic substituents, all as shown by the at-times highly substituted examples, do not affect the basic properties of these Me π-allyls.

The products made in accordance with the invention may be used as catalysts, either as such or in mixture with a Lewis acid and/or Lewis base (electron donor) for the polymerization of olefins and particularly of ethylene and propylene, and for the open chain oligomerization of olefins and diolefins. They may also be used for the copolymerization of mono and diolefins. Polymerization is effected by contacting the olefin with the catalyst, which may be usually accomplished at ordinary temperatures and pressures, applying cooling if necessary.

I claim:

1. Method for the production of a π-allyl transition metal-anion compound which comprises reacting a π-allyl compound of a transition metal of the sub-groups to group IV to VIII of the Periodic System with an anion contributing member of the group consisting of halogen and H⁺X⁻, in which X⁻ is an anionic radical, the number of allyl groups in said starting π-allyl transition metal compound being in excess of any removed from said starting π-allyl transition metal compound in the reaction with said group member.

2. Method according to claim 1, in which said starting π-allyl transition metal compound has at least two of the effective groups

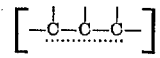

bonded to a transition metal (Me) of sub-groups to Group IV to VIII of the Periodic System.

3. Method according to claim 1, wherein said reaction is carried out in the presence of an inert protective gas.

4. Method according to claim 1, wherein said reaction is carried out in a liquid phase.

5. Method according to claim 1, wherein said radical X⁻ is a member selected from the group consising of chloride, bromide and iodide.

6. Method according to claim 1, wherein said halogen is a member selected from the group consisting of chlorine, bromine and iodine.

7. Method according to claim 2, wherein said transition metal is a member selected from the group consisting of sub-groups IV to VI and Group VII of the Periodic System.

8. Method according to claim 1, in which the halogen is bromine.

9. Method according to claim 1, in which the halogen is iodine.

References Cited

UNITED STATES PATENTS 3,080,305   3/1963   Gorsich _____ 204—158

OTHER REFERENCES

Chatt et al.: J. Chem. Soc. (1960), p. 1721.

TOBIAS E. LEVOW, *Primary Examiner.*

A. P. DEMERS, *Assistant Examiner.*

U.S. Cl. X.R.

252—431; 260—80.3, 93.1, 94.9, 429, 429.3, 429.5, 438.5, 666

UNITED STATES PATENT OFFICE
CERTIFICATE OF CORRECTION

Patent No. 3,424,777                        January 28, 1969

Günther Wilke

It is certified that error appears in the above identified patent and that said Letters Patent are hereby corrected as shown below:

Column 3, line 55, after the formula insert -- (2) --; line 73, "$\pi-(C_3H_5)_3+1/2$ ...*" should read -- $\pi-(C_3H_5)_3Cr+1/2$ .. --. Column 4, line 7, "snitable" should read -- suitable --. Column 5, line 71, "corerspond" should read -- correspond --. Column 8, line 10, the formula should appear as shown below:

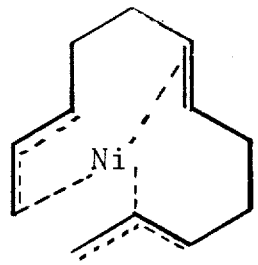

Column 10, line 23, "and Group VII" should read -- and Group VIII --.

Signed and sealed this 30th day of June 1970.

(SEAL)
Attest:

EDWARD M. FLETCHER, JR.
Attesting Officer

WILLIAM E. SCHUYLER, JR.
Commissioner of Patents